(12) United States Patent
Zhang

(10) Patent No.: US 10,527,304 B2
(45) Date of Patent: Jan. 7, 2020

(54) DEMAND RESPONSE BASED AIR CONDITIONING MANAGEMENT SYSTEMS AND METHOD

(71) Applicant: Ecoer Inc., McLean, VA (US)

(72) Inventor: Jianliang Zhang, Beijing (CN)

(73) Assignee: ECOER Inc., Fairfax, VA (US)

( * ) Notice: Subject to any disclaimer, the term of this patent is extended or adjusted under 35 U.S.C. 154(b) by 357 days.

(21) Appl. No.: 15/289,198

(22) Filed: Oct. 9, 2016

(65) Prior Publication Data

US 2018/0100661 A1    Apr. 12, 2018

(51) Int. Cl.
| | | |
|---|---|---|
| F24F 11/30 | (2018.01) | |
| G05B 15/02 | (2006.01) | |
| F24F 11/58 | (2018.01) | |
| F24F 11/62 | (2018.01) | |
| F24F 11/46 | (2018.01) | |
| F24F 11/61 | (2018.01) | |
| F24F 110/12 | (2018.01) | |
| F24F 11/64 | (2018.01) | |
| F24F 130/10 | (2018.01) | |
| F24F 110/10 | (2018.01) | |
| F24F 130/00 | (2018.01) | |

(52) U.S. Cl.
CPC .............. *F24F 11/30* (2018.01); *F24F 11/46* (2018.01); *F24F 11/58* (2018.01); *F24F 11/61* (2018.01); *F24F 11/62* (2018.01); *G05B 15/02* (2013.01); *F24F 11/64* (2018.01); *F24F 2110/10* (2018.01); *F24F 2110/12* (2018.01); *F24F 2130/00* (2018.01); *F24F 2130/10* (2018.01); *G05B 2219/2614* (2013.01)

(58) Field of Classification Search
CPC .. F24F 11/30; F24F 11/61; F24F 11/46; F24F 11/58; F24F 11/62; F24F 2130/00; F24F 2110/10; F24F 2110/12; F24F 11/64; F24F 2130/10; G05B 15/02; G05B 2219/2614
USPC ........................................................ 700/278
See application file for complete search history.

(56) References Cited

U.S. PATENT DOCUMENTS

| | | | | |
|---|---|---|---|---|
| 4,703,325 A | * | 10/1987 | Chamberlin | G07C 3/00 340/517 |
| 5,095,715 A | * | 3/1992 | Dudley | F24D 17/02 237/2 B |
| 2010/0324962 A1 | * | 12/2010 | Nesler | G01R 21/133 705/7.36 |
| 2011/0063126 A1 | * | 3/2011 | Kennedy | G01D 4/002 340/870.02 |
| 2014/0277761 A1 | * | 9/2014 | Matsuoka | G05D 23/1904 700/276 |
| 2015/0219356 A1 | * | 8/2015 | Ito | G05D 23/1904 165/237 |
| 2015/0323948 A1 | * | 11/2015 | Jeong | G05B 15/02 700/291 |

* cited by examiner

*Primary Examiner* — Thomas C Lee
*Assistant Examiner* — Hawa Z Dirie
(74) *Attorney, Agent, or Firm* — John Ye

(57) ABSTRACT

An air conditioning management systems and an air conditioning management method based on demand response requirements. Particularly, their implementation involves stepdown and precooling optimization within the air conditioning management system and air conditioning management method. The technical achievement is that even when demand response power limitation is required, a user can still enjoy optimum cooling comfort within the power restriction limit.

14 Claims, 6 Drawing Sheets

DEMAND RESPONSE BASED AIR CONDITIONING MANAGEMENT SYSTEMS AND METHOD

BACKGROUND OF THE DISCLOSURE

Demand Response (DR), also known as electricity demand response, is the response observed when wholesale electricity prices rise or system reliability threatened, then an user receives incentive signals (including direct compensation signals) from power supplier to reduce the load, or the user receives electricity price increase signals. The response is that the user would change their habits of power consumption, or would shift timing on their electrical load. Therefore, the response would protect the power grid stability and inhibit short-term price spikes.

Currently, the proportion of air conditioning (AC) load in the entire grid is growing. Because the growth in air conditioning load, power grid load is rapidly growing as well. Thus, given the limited grid capacity, this growth compounds further the difference between peak and valley in power delivery. Therefore, implementing demand response in consumers' air-conditioning equipment would achieve more balanced power load control in a significant effect. But at the present time, a large number of consumers are still using air-conditioning equipment that works under fixed output. Therefore, demand response can be implemented only as "on" and "off" states. When demand response is set to the "off" state, that means usage of the air conditioning is stopped. With this demand response control method, one cannot take advantage of certain air conditioning equipment capable of dynamic output adjustment with various upper output limit settings. Therefore, this binary demand response method would cause great inconvenience to air conditioning users.

On the other hand, the current demand response implementation for air conditioning control and does not take into account temperature requirements of the user during the control period. Under the circumstance, the user can only passively accept the consequence of rising indoor temperature. This is not helpful to provide the user with a positive experience in air conditioning usage.

SUMMARY OF THE DISCLOSURE

Based on the aforementioned deficiencies in the existing technologies, one aspect of the technical deficiencies is solved by creating a new air-conditioning management system that would work with a new demand response management method, which is capable of adjusting air conditioning output settings. The technical effect of such new implementation is that, even when under the demand response control, if the load of the air-conditioning can be set to a lower level than the restriction requires, the user can still enjoy air conditioning to a certain cooling level.

Another aspect of the technical deficiencies is solved by the present disclosure under a new demand response control method and a corresponding air conditioning management system. This method would analyze the current temperature and demand requirement, and activate the air conditioning to precool the indoor temperature to a certain level by the time demand response starting time arrives. Thereafter, even under demand response restriction, the user would still feel comfortable as compared to not remediated.

To achieve the above technological objectives, this disclosure presents a new air conditioning demand response management system, which includes:

a network communication module, for receiving from a server platform the power company's DR control instructions and temperature forecast data, where the DR control instructions include power control level and DR control timing;

DR control computation unit for developing DR operation logic based on the DR commands and AC operation parameters, and for generating AC output parameters based on the DR operation logic;

air conditioning operation control unit, which controls the thermostat, the indoor evaporator, and the outdoor condenser, based on AC output parameters generated from the abovementioned DR control computation;

AC operation parameter acquisition unit that acquires from thermostat, the indoor evaporator, and the outdoor condenser, various operation parameters, including indoor and outdoor temperature, the temperature set by the user, and RPM of the compressor;

precooling policy database for storing historic precooling information in connection with performing DR control under a variety of conditions, and the said information includes: DR control beginning indoor temperature A, beginning outdoor temperature A', beginning power consumption level, as well as DR control ending indoor temperature, ending outdoor temperature B' and user temperature setting C;

precooling control logic unit, which analyzes the stored precooling policy information, as well as data from the AC operation parameter acquisition unit, decides whether to activate precooling, then when precooling is needed, further produces precooling logics and generates AC output parameters.

This disclosure presents a new air conditioning demand response management method, which includes:

step 1, receiving from supplier the DR control instructions;

step 2, retrieving data from the precooling policy database and the AC operation parameter acquisition unit, together with the temperature forecast data, determining whether to activate the precooling, and then if it is determined the precooling is needed, determining the precooling starting time, but if it is determined the precooling is not needed, skipping to step 4;

step 3, determining whether the current time is the precooling starting time determined at step 2 as T0, so that if it is, then running the AC at the lowest user temperature setting F0 until DR control is received at T1, but if it is not yet T0, then running the AC at normal RPM logic;

step 4, determining whether the current time is the DR control starting time T1, if it is then proceeding to DR control step 5, but if not, then running the AC compressor at normal RPM logic until that time;

step 5, at DR control starting time T1, determining if DR control output level should be zero, if that is the case, shutting down the AC until DR control ending time T2, but if not, proceeding to step 6;

step 6, determining whether the current time is the DR control ending time T2, if it is, then proceeding to step 10, but if not, then proceeding to step 7;

step 7, determining whether the current AC output level is lower than or equal to the DR control output target, if it is, then running the AC compressor at the normal RPM one timing cycle until the time when the output RPM is re-determined and exiting back to step 6, but if not, then proceeding to step 8;

step 8, determining whether it is the first time DR control needs to limit the AC compressor RPM, if it is, then lowering the AC compressor RPM by multiplying it with a ratio of target output/current output (i.e. setting the compressor output to target output), but if not, then setting the AC compressor RPM to a predetermined value of Y, and proceed to step 9;

step 9, running the AC compressor RPM at a rate determined at step 8 one timing cycle until the time when the output RPM is re-determined, and exiting back to step 6;

step 10, before exiting out of the DR management method, record the DR management process data into the precooling policy database.

To understand in step 8 better, that the predetermined AC compressor RPM value of Y can be set by a number of reasons (functioning as an override value), and that step 8 could be triggered to react to the fact that Y value of RPM should be run. Also this disclosure uses compressor RMP and compressor output interchangeably. It could be attractive to implement the system and method to accommodate multiple power targets at different timings during the DR control. It could also be attractive to implement the system and method to be optimized to react to multiple DR control events that are closely related.

DETAILED DESCRIPTION OF THE DISCLOSURE

First Embodiment

Figure 1A:
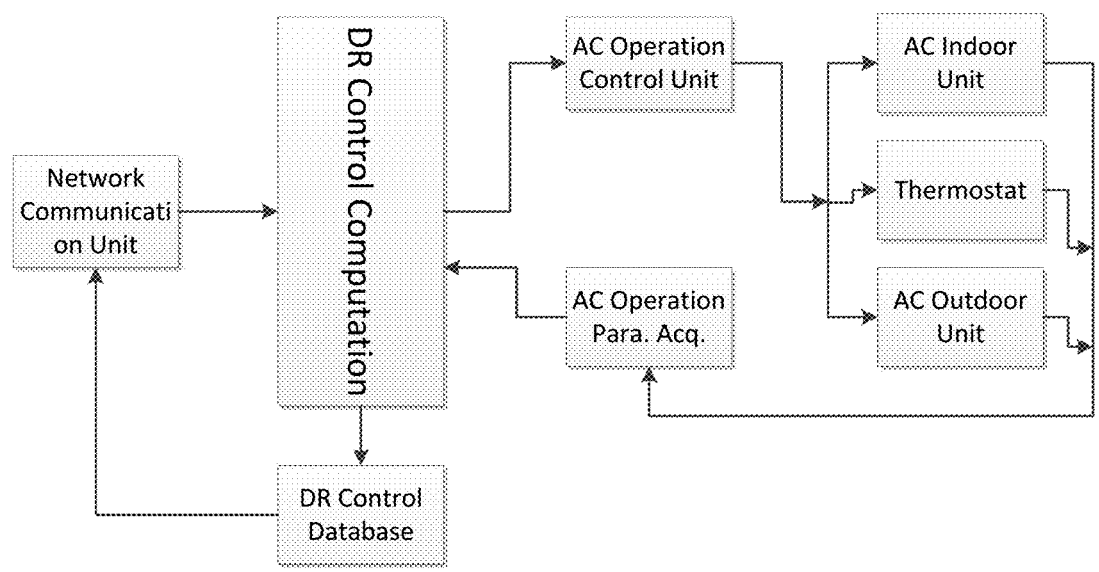
FIG. 1*a* shows a management system of the present disclosure including a schematic view of a first embodiment.

As shown in FIG. 1*a*, the air conditioning management system of this embodiment includes a network communication module for a network communication module, for receiving from a server platform the power company's DR control instructions and temperature forecast data, where the DR control instructions include power control level and DR control timing. The air conditioning management system of this embodiment also includes a DR control computation unit for developing DR operation logic based on the DR commands and AC operation parameters, and for generating AC output parameters based on the DR operation logic. The air conditioning management system of this embodiment also includes an air conditioning operation control unit, which controls the thermostat, the indoor evaporator, and the outdoor condenser, based on AC output parameters generated from the abovementioned DR control computation. The air conditioning management system of this embodiment also includes an AC operation parameter acquisition unit that acquires from thermostat, the indoor evaporator, and the outdoor condenser, various operation parameters, including indoor and outdoor temperature, the temperature set by the user, and RPM of the compressor. The air conditioning management system of this embodiment also includes a DR control database, which is used to record data in the DR control process.

DR control instructions include setting power control levels and DR control timing, in which the power consumption level of control is given as a percentage, for example, 100%, 90%, 85%, 55% . . . 0%. For example, if the power control level of 85% is given, it means that marked cold condition outside machine rated power (Air-Conditioning, Heating, and Refrigeration Institute—AHRI standard refrigeration conditions)×85% is the target power consumption value of this DR control. But if 0% is for this DR control, then it means a forced shut down for the air-conditioning system. DR control time instructions include the starting time T1 and the end time T2. When the DR control starting time T1 comes, the air conditioning management system of this embodiment enters into DR logic control of the air conditioning system. When the ending time T2 comes, the air conditioning management system exits the DR control mode, and data from the DR control process is stored into the DR control database. Also disclosed is a network communication module to upload the data to a remote server.

Figure 1B:
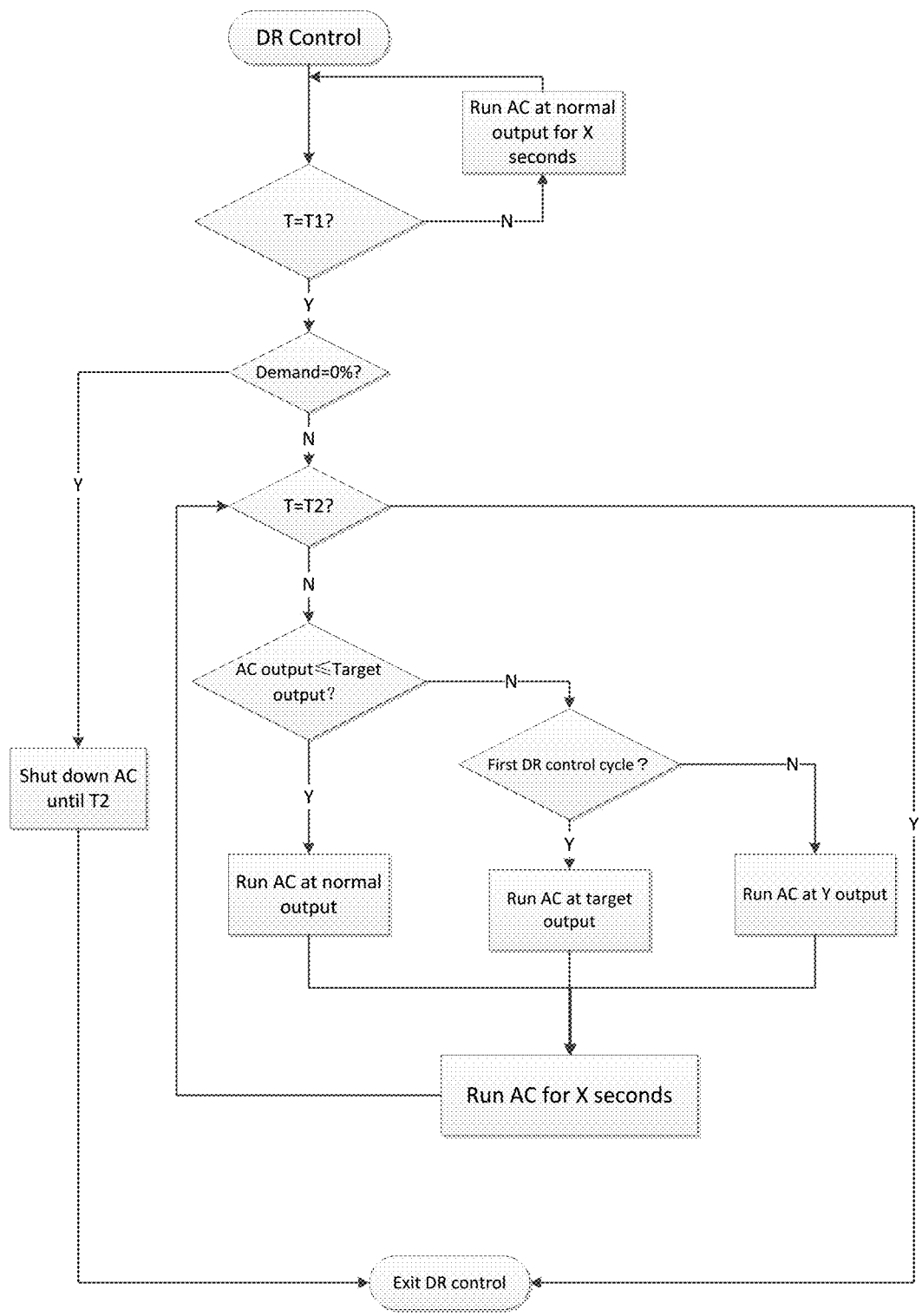
FIG. 1*b* is a flowchart showing an air conditioning management method of the first embodiment.

The DR control management method in FIG. 1*b* of the flow chart can be explained as follows:

step 1, receiving from supplier the DR control instructions;

step 2, determining whether the current time is the DR control starting time T1, if it is then proceeding to DR control step 3, but if not, then running the AC compressor at normal RPM logic until that time;

step 3, at DR control starting time T1, determining if DR control output level should be zero, if that is the case, shutting down the AC until DR control ending time T2, but if not, proceeding to step 4;

step 4, determining whether the current time is the DR control ending time T2, if it is, then proceeding to step 8, but if not, then proceeding to step 5;

step 5, determining whether the current AC output level is lower than or equal to the DR control output target, if it is, then running the AC compressor at the normal RPM one timing cycle until the time when the output RPM is re-determined and exiting back to step 6, but if not, then proceeding to step 6;

step 6, determining whether it is the first time DR control needs to limit the AC compressor RPM, if it is, then lowering the AC compressor RPM by multiplying it with a ratio of target output/current output, but if not, then setting the AC compressor RPM to a predetermined value of Y, and proceed to step 7;

step 7, running the AC compressor RPM at a rate determined at step 6 one timing cycle until the time when the output RPM is re-determined, and exiting back to step 4;

step 8, before exiting out of the DR management method, record the DR management process data into the precooling policy database.

In the present embodiment, if the DR control instructions require immediate control execution for the air-conditioning system, the DR control method would include:

step 1, receiving from supplier the DR control instructions to start immediately;

step 2, determining if DR control output level should be zero, if that is the case, shutting down the AC until DR control ending time T2, but if not, proceeding to step 3;

step 3, determining whether DR control ending command is received, if it is, then proceeding to step 7, but if not, then proceeding to step 4;

step 4, determining whether the current AC output level is lower than or equal to the DR control output target, if it is, then running the AC compressor at the normal RPM one timing cycle until the time when the output RPM is re-determined and exiting back to step 3, but if not, then proceeding to step 5;

step 5, determining whether it is the first time DR control needs to limit the AC compressor RPM, if it is, then lowering the AC compressor RPM by multiplying it with a ratio of target output/current output, but if not, then setting the AC compressor RPM to a predetermined value of Y, and proceed to step 6;

step 6, running the AC compressor RPM at a rate determined at step 5 one timing cycle until the time when the output RPM is re-determined, and exiting back to step 4;

step 7, before exiting out of the DR management method, record the DR management process data into the precooling policy database.

In the DR control process, the current air-conditioning compressor output value Y, can be set by the remote server, or preset by the user, or calculated by the DR control computation unit from a set of preconfigured model data.

The technical effect of such new implementation is that, even when under the demand response control, if the load of the air-conditioning can be set to a lower level than the restriction requires, the user can still enjoy air conditioning to a certain cooling level, and not having to be limited to a shutdown option that would damage his air conditioning experience.

Second Embodiment

Figure 2A:
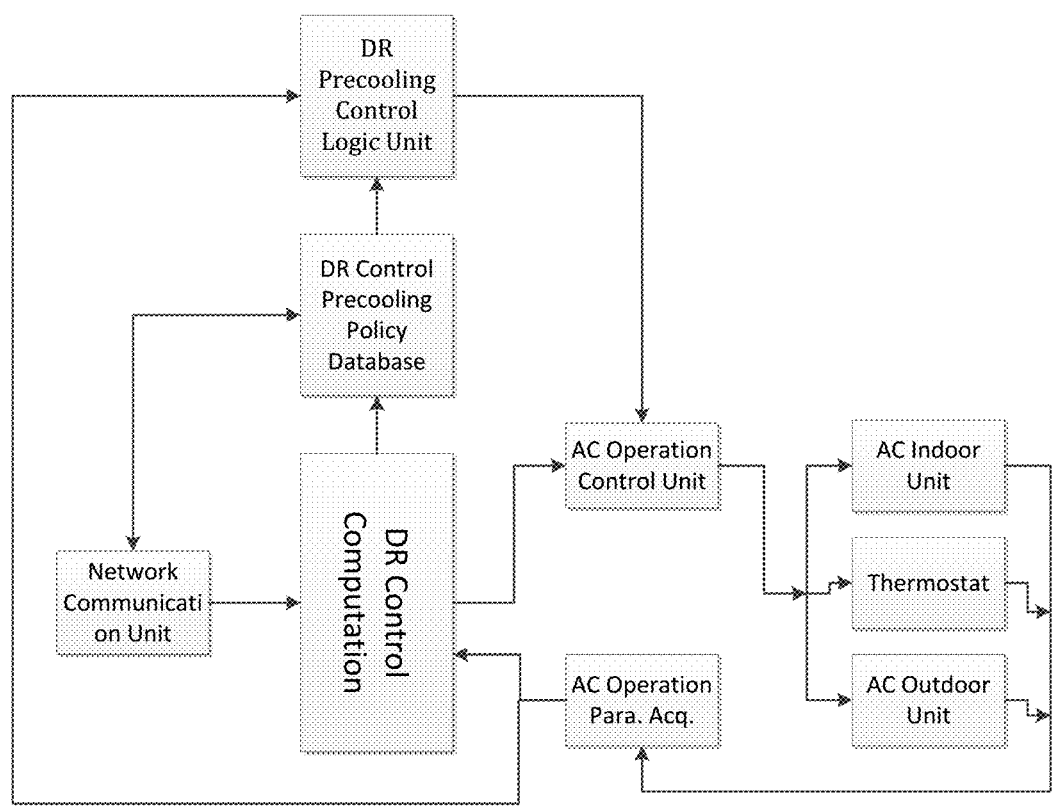
FIG. 2*a* shows a second embodiment of the present disclosure including a schematic view of an air conditioning management system.

As shown in FIG. 2a, the air conditioning management system of this embodiment includes a network communication module for a network communication module, for receiving from a server platform the power company's DR control instructions and temperature forecast data, where the DR control instructions include power control level and DR control timing. The air conditioning management system of this embodiment also includes a DR control computation unit for developing DR operation logic based on the DR commands and AC operation parameters, and for generating AC output parameters based on the DR operation logic. The air conditioning management system of this embodiment also includes an air conditioning operation control unit, which controls the thermostat, the indoor evaporator, and the outdoor condenser, based on AC output parameters generated from the abovementioned DR control computation. The air conditioning management system of this embodiment also includes an AC operation parameter acquisition unit that acquires from thermostat, the indoor evaporator, and the outdoor condenser, various operation parameters including indoor and outdoor temperature, the temperature set by the user, and RPM of the compressor. The air conditioning management system of this embodiment also includes a precooling policy database for storing historic precooling information in connection with performing DR process control under a variety of conditions, and the said information includes: DR control beginning indoor temperature A, beginning outdoor temperature A', beginning power consumption level, as well as DR control ending indoor temperature, ending outdoor temperature B' and user temperature setting C. The air conditioning management system of this embodiment also includes a precooling control logic unit, which analyzes the stored precooling policy information, and data from the AC operation parameter acquisition unit, as well as temperature forecast data, decides whether to activate precooling. When precooling is needed, further produces precooling logics and generates AC output parameters.

Precooling policy information database stores DR control information under various conditions, each set of DR control information includes: DR control beginning indoor temperature A, beginning outdoor temperature A', beginning power consumption level, as well as DR control ending indoor temperature, ending outdoor temperature B' and user temperature setting C. When the precooling control logic unit determines the need for precooling, it retrieves from the policy information database filtered data for which the power control levels and the user set temperature C matches the current power control level and the current user set temperature C. Then it could further filters the data where the difference between the outdoor temperature A' and the outdoor temperature B' is X or less in degree. The value X can be set by the user, or by a remote server. If the resulting data exists where the ending room temperature B>beginning room temperature A, that indicates the current DR control requires precooling.

When the precooling control logic unit determines that the current DR control requires precooling, it then calculates based on the current indoor temperature, the outdoor temperature, the forecast temperature data, the user's preset minimum withstand temperature, and maximum AC power consumption, to derive at a DR control precooling start time T0. T0 is a value that by the time the DR control start time arrives, precooling would have achieved bringing down the indoor temperature to the user preset minimum withstand temperatures. Also, the precooling control logic unit activates the precooling process when current time reaches the pre-cooling start time point T0. In case when T0 is a value that is already too late, such as when there is not enough lead time in receiving the DR control instructions, the precooling process should be started immediately.

Figure 2B:
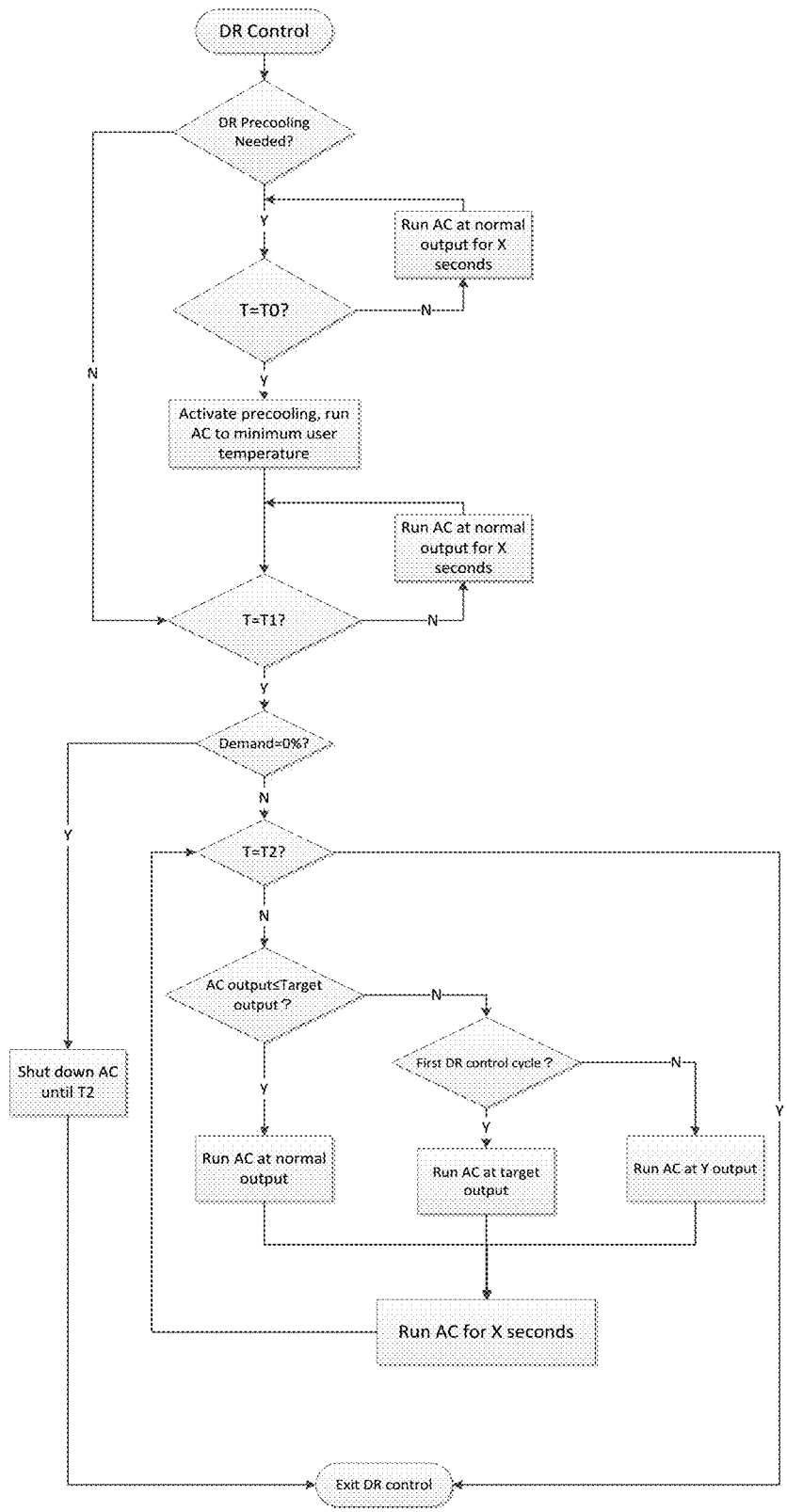
FIG. 2*b* shows in a flow chart of an air conditioning management method of the second embodiment.

As shown in FIG. 2b, is a DR control management method comprising the following steps:

step 1, receiving from supplier the DR control instructions;

step 2, retrieving data from the precooling policy database and the AC operation parameter acquisition unit, together with the temperature forecast data, determining whether to activate the precooling, and then if it is determined the precooling is needed, determining the precooling starting time, but if it is determined the precooling is not needed, skipping to step 4;

step 3, determining whether the current time is the pre-cooling starting time determined at step 2 as T0, so that if it is, then running the AC from the lowest user temperature setting F0 until DR control is received at T1, but if it is not yet T0, then running the AC at normal RPM logic;

step 4, determining whether the current time is the DR control starting time T1, if it is then proceeding to DR control step 5, but if not, then running the AC compressor at normal RPM logic until that time;

step 5, at DR control starting time T1, determining if DR control output level should be zero, if that is the case, shutting down the AC until DR control ending time T2, but if not, proceeding to step 6;

step 6, determining whether the current time is the DR control ending time T2, if it is, then proceeding to step 10, but if not, then proceeding to step 7;

step 7, determining whether the current AC output level is lower than or equal to the DR control output target, if it is, then running the AC compressor at the normal RPM one timing cycle until the time when the output RPM is re-determined and exiting back to step 6, but if not, then proceeding to step 8;

step 8, determining whether it is the first time DR control needs to limit the AC compressor RPM, if it is, then lowering the AC compressor RPM by multiplying it with a ratio of target output/current output, but if not, then setting the AC compressor RPM to a predetermined value of Y, and proceed to step 9;

step 9, running the AC compressor RPM at a rate determined at step 8 one timing cycle until the time when the output RPM is re-determined, and exiting back to step 6;

step 10, before exiting out of the DR management method, record the DR management process data into the precooling policy database.

In the DR control management method described above, recording the DR management process data into the precooling policy database will enable the precooling control logic unit to implement a machine learning function. In addition, the precooling policy information database can be uploaded to a remote server, so that the remote server has data from many different users to process and compare, in designing a more accurate precooling strategy for each user through optimization. The resulting strategized database can be downloaded into the end user's policy information database.

Technical effects of the present embodiment is that the DR management system and DR management method can intelligently react to DR control instructions by maximizing the AC output to meet the user's cooling demand, all within the limitation of the load requirement. The maximization takes the form of precooling because the user's cooling demand might exceed the supply during DR control period. By precooling, indoor temperature can be lowered before DR control starting time, offsetting the negative impact from DR control. Therefore, the overall user demand for cooling in the DR control period could be satisfied to the maximum level.

Third Embodiment

Figure 3A:
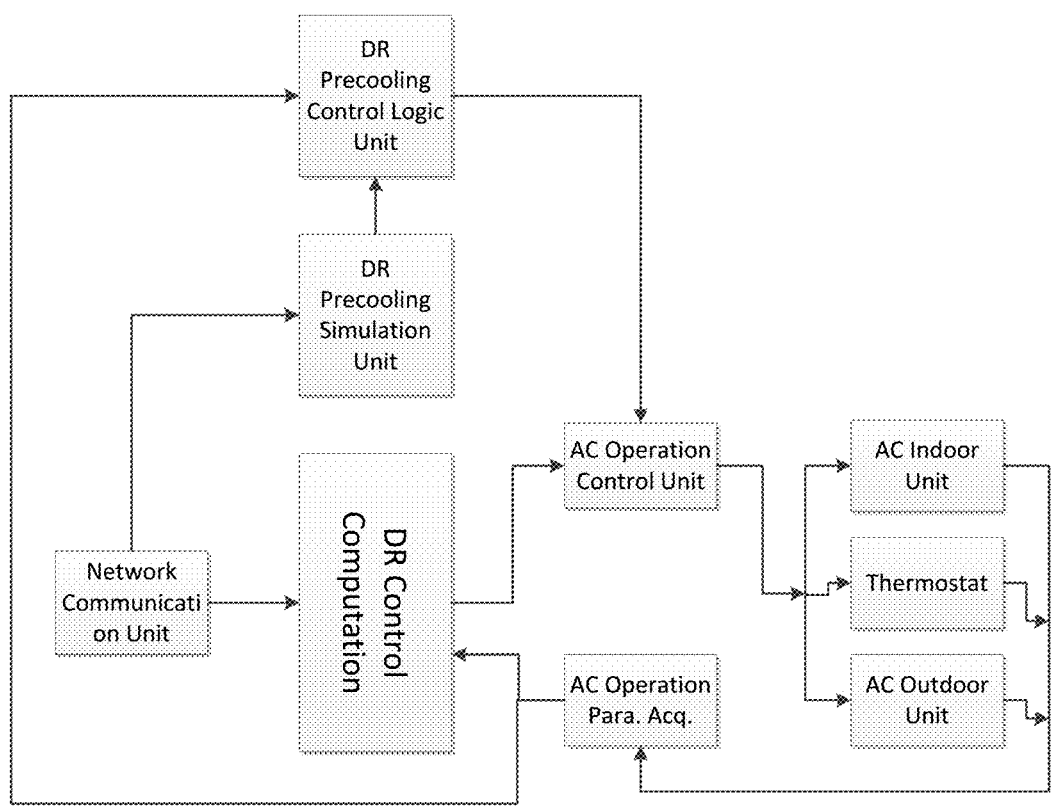
FIG. 3*a* shows a schematic view of an air conditioning management system of a third embodiment.

As shown in FIG. 3a, an air conditioning management system of this embodiment includes a network communication module for a network communication module, for receiving from a server platform the power company's DR control instructions and temperature forecast data, where the DR control instructions include power control level and DR control timing. The air conditioning management system of this embodiment also includes a DR control computation unit for developing DR operation logic based on the DR commands and AC operation parameters, and for generating AC output parameters based on the DR operation logic. The air conditioning management system of this embodiment also includes an air conditioning operation control unit, which controls the thermostat, the indoor evaporator, and the outdoor condenser, based on AC output parameters generated from the abovementioned DR control computation. The air conditioning management system of this embodiment also includes an AC operation parameter acquisition unit that acquires from thermostat, the indoor evaporator, and the outdoor condenser, various operation parameters including indoor and outdoor temperature, the temperature set by the user, and RPM of the compressor. The air conditioning management system of this embodiment also includes a precooling modeling unit. The precooling modeling unit (a modified precooling policy database in Embodiment 2 having its own logic processor), in addition to collect what is collected by the precooling policy database in Embodiment 2, also collects temperature forecast data, DR control timing, user temperature setting, user indoor and outdoor temperature measurements, etc. The precooling modeling unit then produces simulated indoor temperature projection plot. The air conditioning management system of this embodiment also includes a precooling control logic unit, which analyzes the simulated indoor temperature projection plot produced by the precooling modeling unit, decides whether to activate precooling. When precooling is needed, precooling control logic unit further produces precooling logics and generates AC output parameters.

Specifically, the precooling modeling unit needs to collect temperature forecast data, DR control timing, user temperature setting, user indoor and outdoor temperature measurements, etc., together with the DR control logic explained in Embodiment 2 and power level adjustment logic in the AC system, in order to simulate DR control performance. From the DR control performance simulation, the result would be an indoor temperature projection plot predicting how the DR control will result this time without precooling. If the DR ending time temperature is greater than the starting time temperature, then that means precooling is needed.

Similar to the logic of precooling application in Embodiment 2, after the precooling control logic unit determines that the current DR control requires precooling, it then calculates based on the current indoor temperature, the outdoor temperature, the forecast temperature data, the user's preset minimum withstand temperature, and maximum AC power consumption, to derive at a DR control precooling start time T0. T0 is a value that by the time the DR control start time arrives, precooling would have achieved bringing down the indoor temperature to the user preset minimum withstand temperatures.

Figure 3B:
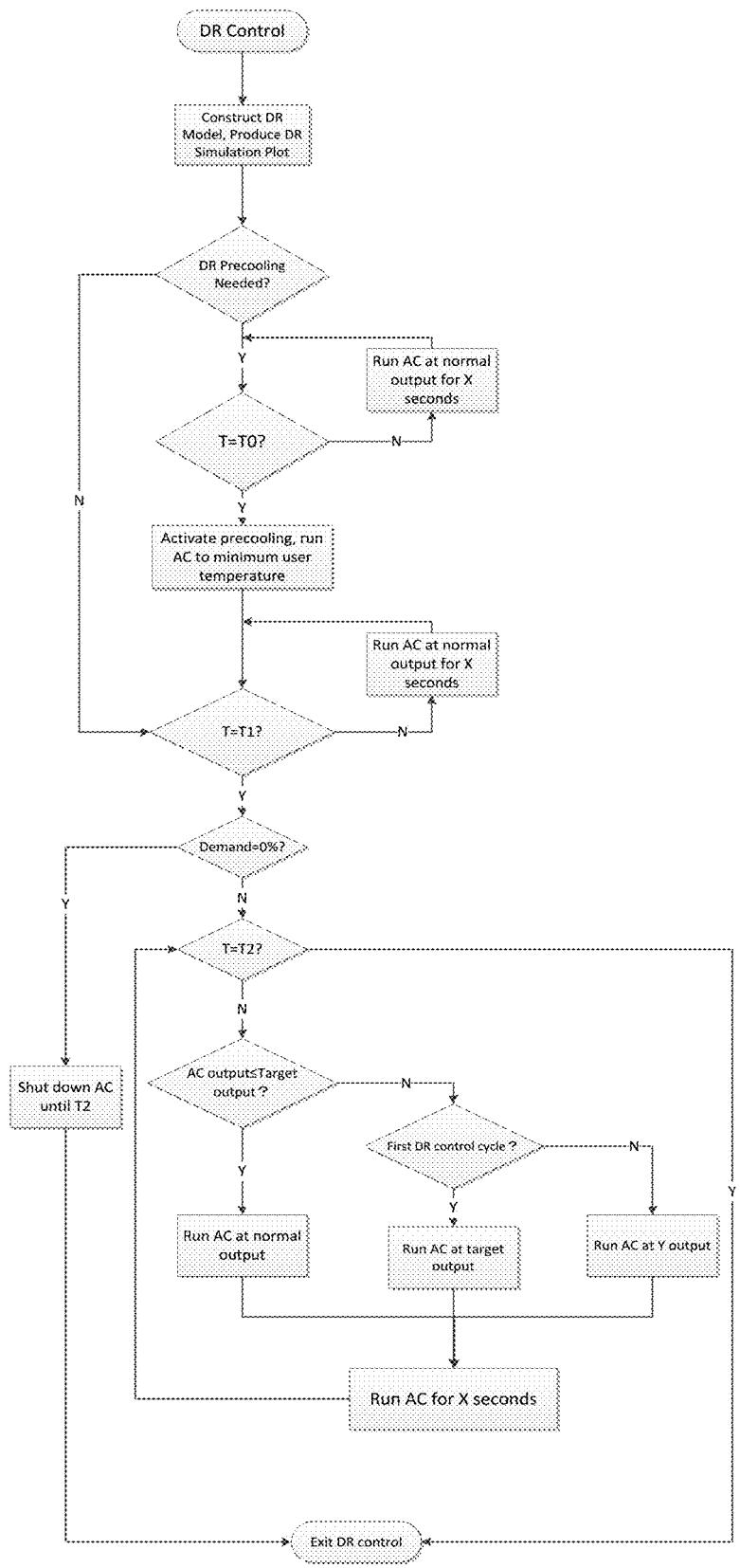
FIG. 3*b* shows in a flow chart of an air conditioning management method of the third embodiment.

As shown in FIG. 3b, is an air conditioning management method comprising the following steps:

step 1, receiving from supplier the DR control instructions;

step 2, produce a simulated indoor temperature plot during DR control timing step 3, from the simulated indoor temperature plot produced in step 2, determining whether to activate the precooling, and then if it is determined the precooling is needed, determining the precooling starting time, but if it is determined the precooling is not needed, skipping to step 5;

step 4, determining whether the current time is the precooling starting time determined at step 3 as T0, so that if it is, then running the AC from the lowest user temperature setting F0 until DR control is received at T1, but if it is not yet T0, then running the AC at normal RPM logic;

step 5, determining whether the current time is the DR control starting time T1, if it is then proceeding to DR control step 6, but if not, then running the AC compressor at normal RPM logic until that time;

step 6, at DR control starting time T1, determining if DR control output level should be zero, if that is the case, shutting down the AC until DR control ending time T2, but if not, proceeding to step 7;

step 7, determining whether the current time is the DR control ending time T2, if it is, then proceeding to step 11, but if not, then proceeding to step 8;

step 8, determining whether the current AC output level is lower than or equal to the DR control output target, if it is, then running the AC compressor at the normal RPM one timing cycle until the time when the output RPM is re-determined and exiting back to step 7, but if not, then proceeding to step 9;

step 9, determining whether it is the first time DR control needs to limit the AC compressor RPM, if it is, then lowering the AC compressor RPM by multiplying it with a ratio of target output/current output, but if not, then setting the AC compressor RPM to a predetermined value of Y, and proceed to step 10;

step 10, running the AC compressor RPM at a rate determined at step 9 one timing cycle until the time when the output RPM is re-determined, and exiting back to step 7;

step 11, before exiting out of the DR management method, record the DR management process data.

Technical effects of the present embodiment is that the DR management system and DR management method can intelligently react to DR control instructions by maximizing the AC output to meet the user's cooling demand, all within the limitation of the load requirement. The maximization takes the form of precooling because the user's cooling demand might exceed the supply during DR control period. By precooling, indoor temperature can be lowered before DR control starting time, offsetting the negative impact from DR control. Therefore, the overall user demand for cooling in the DR control period could be satisfied to the maximum level.

The invention claimed is:

1. A demand response (DR) control system comprising:
a network communication module, for receiving from a server platform the power company's DR control instructions where the DR control instructions include target power control level and DR control timing; and
a DR control computation unit for developing DR operation logic based on the DR commands and air conditioning (AC) operation parameters, and for generating AC output parameters based on the DR operation logic; and
an air conditioning operation control unit, which controls the AC operation, based on AC output parameters generated from the said DR control computation unit; and
an AC operation parameter acquisition unit that acquires from the AC system, various operation parameters, wherein
if at DR starting time, AC normal operation output is not greater than target power control level, then the system runs the AC at normal operation output, or else, runs the AC at target power control level; and
the system periodically resets the AC power output until DR ending time, wherein
the network communication module receives additional temperature forecast data; and
the DR control computation unit for developing DR operation logic is based on the additional temperature forecast data; and
the demand response control system further comprising: a precooling policy database which stores information needed to decide whether precooling is activated; and
a precooling control logic unit that can set precooling logic,
wherein
the AC operation parameter acquisition unit acquires indoor thermal profile and AC cooling profile from thermostat, indoor evaporator, and outdoor condenser, various operation parameters, including indoor and outdoor temperature, temperature set by the user, and RPM of the compressor; and
the precooling policy database stores historic precooling information in connection with performing DR control under a variety of conditions, and the said information includes: DR control beginning indoor temperature A, beginning outdoor temperature A', beginning power consumption level, as well as DR control ending indoor temperature, ending outdoor temperature B' and user temperature setting C; and
the precooling control logic unit performs matching functions based on the stored precooling policy information, as well as data from the AC operation parameter acquisition unit, decides whether to activate precooling, then when precooling is needed, further produces precooling timing.

2. The demand response control system according to claim 1, wherein
the need for precooling is determined by retrieving from the policy information database filtered data for which the power control level and the user set temperature C matches the current power control level and the current user set temperature C, and if the resulting data exists where the ending room temperature B>beginning room temperature A.

3. The demand response control system according to claim 1, wherein
the precooling policy database is added with processing power to perform simulation, resulting in a precooling modeling unit, which also collects temperature forecast data, DR control timing, user temperature setting, user indoor and outdoor temperature measurements, etc. enabling the precooling modeling unit to produce a simulated room temperature projection plot for the DR control period, and based on the simulated room temperature projection plot, activate precooling where the ending room temperature B>beginning room temperature A.

4. The demand response control system according to claim 2, wherein
the need for precooling is further determined when data exists where difference between the outdoor temperature A' and the outdoor temperature B' is X or less in degree where the value X can be set by the user, or by a remote server.

5. The demand response control system according to claim 4, wherein
the precooling control logic unit implements a machine learning function so that X can be set at an optimal value; and
the precooling control logic unit starts the precooling immediately if the precooling starting time would already be late.

6. The demand response control system according to claim 5, wherein
the precooling policy information database can be uploaded to a remote server, so that the remote server has data from many different users to process and compare, in designing a more accurate precooling strategy for each user through optimization and the resulting strategized database can be downloaded into the end user's policy information database.

7. A demand response (DR) control method comprising:
receiving from supplier the DR control instructions, which includes target power control level and DR control timing; and
determining if the DR control needs immediate execution, or do so at a later starting time; and
  at DR starting time, determining whether current power output is not greater than the DR control target, and continuing the normal AC power output, but if not, then lowering the power output to the target level; and
  re-determining periodically whether current power output should be maintained, or a value Y should be used, wherein
  the receiving from supplier the DR control instructions, further includes additional temperature forecast data; and
the demand response control method further comprising:
  determining if precooling is needed, and if needed, when it should start; and
recording the DR control process data, wherein
  the determining of needing precooling is based on matching indoor thermal profile and AC cooling profile in:
    AC operation parameter data from AC thermostat, indoor evaporator, and outdoor condenser, various operation parameters, including indoor and outdoor temperature, temperature set by user, and RPM of the compressor; and
    historic precooling policy information in connection with performing DR control under a variety of conditions, and the said information includes: DR control beginning indoor temperature A, beginning outdoor temperature A', beginning power consumption level, as well as DR control ending indoor temperature, ending outdoor temperature B" and the user temperature setting C.

8. The demand response control method according to claim 7, wherein
  the determining of needing precooling is further based on precooling policy data for which the power control level and the user set temperature C matches the current power control level and the current user set temperature C, and if the resulting data exists where the ending room temperature B>beginning room temperature A.

9. The demand response control method according to claim 7, wherein
  the determining of needing precooling is further based on simulation, which is based on temperature forecast data, DR control timing, user temperature setting, user indoor and outdoor temperature measurements, etc., in order to produce a room temperature projection plot for the DR control period, and from the simulated room temperature projection plot, where the ending room temperature B>beginning room temperature A.

10. The demand response control method according to claim 8, wherein
  the determining of needing precooling is further based precooling policy data exists where difference between the outdoor temperature A' and the outdoor temperature B' is X or less in degree where the value X can be set by the user, or by a remote server, or by a machine learning function.

11. The demand response control method in claim 10, further comprising:
  uploading the precooling policy data to a remote server;
  processing and comparing at the remote server the precooling policy data from many different users to design a more accurate precooling strategy for each user through optimization; and
  downloading the resulting strategized data to be stored.

12. A non-transitory computer-readable medium having stored thereon a set of computer-executable instructions for causing a first device to perform steps comprising:
  receiving from supplier the DR control instructions, which includes target power control level, DR control timing and temperature forecast data; and
determining if the DR control needs immediate execution, or do so at a later starting time; and
  at DR starting time, determining whether current power output is not greater than the DR control target, and continuing the normal AC power output, but if not, then lowering the power output to the target level; and
re-determining periodically whether current power output should be maintained, or a value Y should be used; and
  determining if precooling is needed, and if needed, when it should start; and recording the DR control process data, wherein
  the determining of needing precooling is based on matching indoor thermal profile and AC cooling profile in:
    AC operation parameter data from AC thermostat, indoor evaporator, and outdoor condenser, various operation parameters, including indoor and outdoor temperature, temperature set by user, and RPM of the compressor; and
  historic precooling policy information in connection with performing DR control under a variety of conditions, and the said information includes: DR control beginning indoor temperature A, beginning outdoor temperature A', beginning power consumption level, as well as DR control ending indoor temperature, ending outdoor temperature B' and the user temperature setting C; and
  precooling policy data for which the power control level and the user set temperature C matches the current power control level and the current user set temperature C, and if the resulting data exists where the ending room temperature B>beginning room temperature A; and
  precooling policy data exists where difference between the outdoor temperature A' and the outdoor temperature B' is X or less in degree where the value X can be set by the user, or by a remote server, or by a machine learning function.

13. The non-transitory computer-readable medium having stored thereon a set of computer-executable instructions for causing the first device to perform the steps according to claim 12, further comprising:
  uploading the precooling policy data to a remote server;
  processing and comparing at the remote server the precooling policy data from many different users to design a more accurate precooling strategy for each user through optimization; and
  downloading the resulting strategized data to be stored.

14. The non-transitory computer-readable medium having stored thereon a set of computer-executable instructions for causing the first device to perform the steps according to claim 12, wherein
  the determining of needing precooling is further based on simulation, which is based on temperature forecast data, DR control timing, user temperature setting, user indoor and outdoor temperature measurements, etc., in order to produce a room temperature projection plot for the DR control period, and from the simulated room temperature projection plot, where the ending room temperature B>beginning room temperature A.

* * * * *